United States Patent [19]

Usui et al.

[11] Patent Number: 5,733,828
[45] Date of Patent: Mar. 31, 1998

[54] HERMETIC SEALING COMPOSITION

[75] Inventors: Hiroshi Usui; Tsuneo Manabe; Kazuo Harada; Ryuichi Tanabe, all of Yokohama, Japan

[73] Assignee: Asahi Glass Company Ltd., Tokyo, Japan

[21] Appl. No.: 797,118

[22] Filed: Feb. 10, 1997

[30] Foreign Application Priority Data

Feb. 15, 1996 [JP] Japan ................... 8-027872
Sep. 11, 1996 [JP] Japan ................... 8-240817

[51] Int. Cl.$^6$ ............... C03C 8/24; C03C 3/14; C03C 3/15
[52] U.S. Cl. ............... 501/17; 501/15; 501/49; 501/50; 501/77; 501/78; 501/79
[58] Field of Search ............... 501/15, 17, 49, 501/50, 77, 78, 79

[56] References Cited

U.S. PATENT DOCUMENTS 5,252,521  10/1993  Roberts ................... 501/17
5,643,840  7/1997  Hikata et al. ................... 501/15

FOREIGN PATENT DOCUMENTS 8-59294    3/1996   Japan.
775061    10/1980   Russian Federation.
923976    4/1982   Russian Federation.
1477706   5/1989   Russian Federation.

*Primary Examiner*—Karl Group
*Attorney, Agent, or Firm*—Oblon, Spivak, McClelland, Maier & Neustadt, P.C.

[57] ABSTRACT

A hermetic sealing composition consisting essentially of from 60 to 99 wt % of a bismuth type low melting glass powder and from 1 to 40 wt % of a low expansion ceramic filler powder, wherein the low melting glass has a composition consisting essentially of:

| | |
|---|---|
| $Bi_2O_3$ | 77 to 95 wt %, |
| $MgO + ZnO$ | 1 to 20 wt %, |
| $B_2O_3$ | 2 to 10 wt %, |
| $SiO_2$ | 0 to 1 wt % and |
| $CeO_2$ | 0 to 10 wt %. |

6 Claims, No Drawings

5,733,828

HERMETIC SEALING COMPOSITION

BACKGROUND OF THE INVENTION

Field of the Invention

The present invention relates to a hermetic sealing composition which can be sealed by heat treatment at a low temperature and which is useful for hermetically sealing a panel and a funnel of a cathode ray tube (CRT) and a hermetic sealing composition which is useful for hermetically sealing a plasma display panel (PDP) or a fluorescent character display tube (VFD).

Discussion of Background

Heretofore, for hermetically sealing a panel and a funnel of a color CRT, it has been common to employ a $PbO$-$B_2O_3$-$ZnO$-$SiO_2$ crystalline low melting glass of the type as disclosed in JP-B-36-17821 and to carry out hermetic sealing by maintaining it at a temperature of from 440° to 450° C. for from 30 to 40 minutes. The panel and funnel assembly thus sealed, will then be evacuated while being heated at a temperature of from 300° to 380° C., to have the interior highly vacuumed to a level of $10^{-6}$ Torr or less.

On the other hand, for hermetically sealing glass substrates for PDP or VFD, it has heretofore been common to employ a low melting glass and to carry out hermetic sealing by maintaining it at a temperature of from 440° to 500° C. In the case of PDP, the panel thus sealed is evacuated while being heated at a temperature of from 250° to 380° C., and a gas for electric such as Ne or He-Xe will be sealed in to a level of from 100 to 500 Torr. In the case of VFD, the sealed panel will be evacuated while being heated at a temperature of from 250° to 380° C., to attain vacuum and then hermetically sealed.

In conventional hermetic sealing glass powders, a glass containing a lead component has been used. Recently, however, it has been desired to use a glass containing no lead component, which is advantageous from the view point of e.g. recycling.

Conventional lead-free hermetic sealing glass powders have had drawbacks such that due to mismatching of their thermal expansion coefficients with glasses to be sealed, panels are likely to break, and the solder is likely to flow on glass substrates or form bubbles, or the sealed portions tend to crack by heating during the evacuation.

SUMMARY OF THE INVENTION

It is an object of the present invention to provide a glass ceramic composition suitable for hermetically sealing CRT, PDP and VFD by using a glass powder containing no lead component.

The present invention provides a hermetic sealing composition consisting essentially of from 60 to 99 wt % of a bismuth type low melting glass powder and from 1 to 40 wt % of a low expansion ceramic filler powder, wherein the low melting glass has a composition consisting essentially of:

| | |
|---|---|
| $Bi_2O_3$ | 77 to 95 wt %, |
| MgO + ZnO | 1 to 20 wt %, |
| $B_2O_3$ | 2 to 10 wt %, |
| $SiO_2$ | 0 to 1 wt % and |
| $CeO_2$ | 0 to 10 wt %. |

DETAILED DESCRIPTION OF THE PREFERRED EMBODIMENTS

The compositional ranges of the bismuth type low melting glass in the present invention will be described below.

In the present invention, a low melting glass having a softening point of at most 500° C. is employed so that it is capable of sufficiently flow at a relatively low temperature of from 400° C. to 550° C. and in a short period of time (from 6 minutes to 1 hour) for hermetic sealing. The low melting glass of the present invention is preferably crystalline in a case where hermetic sealing is required to be completed in a short time as in the case of hermetic sealing of CRT. On the other hand, in the case of an application where hermetic sealing is carried out via a plurality of heating steps, the low melting glass may sometimes be preferably non-crystalline.

Here, crystalline glass is the one which shows an exothermic peak in a differential thermal analysis (DTA) when heated at a rate of 10° C./min and maintained at the hermetic sealing temperature (from 400° to 500° C.) for two hours.

The low melting glass has the following compositional ranges:

| | |
|---|---|
| $Bi_2O_3$ | 77 to 95 wt %, |
| MgO + ZnO | 1 to 20 wt %, |
| $B_2O_3$ | 2 to 10 wt %, |
| $SiO_2$ | 0 to 1 wt % and |
| $CeO_2$ | 0 to 10 wt %. |

If the content of $Bi_2O_3$ is less than 77 wt %, the softening point tends to be too high, the fluidity tends to be poor, and the strength and air tightness of the sealed portion are likely to be impaired, whereby hermetic sealing may not be carried out at a temperature of from 400° to 550° C. On the other hand, if the content exceeds 95 wt %, vitrification tends to be difficult. The content is preferably at least 79% and at most 93%.

With respect to ZnO and MgO, at least one of them may be incorporated. If their total content is less than 1 wt %, crystallization tends to proceed too much during heating of the low melting glass, whereby the fluidity tends to be poor. On the other hand, if the total content exceeds 20 wt %, the softening point tends to be too high, and the fluidity tends to be poor. In either case, the strength and air tightness of the sealed portion are likely to be impaired, whereby hermetic sealing may not be carried out at a temperature of from 400° to 550° C. Their total content is preferably at least 2 wt % and at most 15 wt %.

Specifically, MgO is preferably from 0 to 8 wt %. If it exceeds 8 wt %, vitrification tends to be difficult, whereby a stabilized glass may not be obtained. ZnO is preferably from 0 to 20 wt %. If it exceeds 20 wt. %, the softening point tends to be high.

Further, the total content of ZnO and $Bi_2O_3$ is preferably from 85 to 98 wt %. If the total content is less than 85 wt %, the hermetic sealing temperature tends to be too high. Particularly preferably, the total content is at least 87 wt %.

If the content of $B_2O_3$ is less than 2 wt %, the fluidity of the glass tends to be poor, and the strength and air tightness of the sealed portion are likely to be impaired. If the content exceeds 10 wt %, the softening point of the glass tends to be high, whereby hermetic sealing may not be carried out at a temperature of from 400° to 550° C. The content is preferably at least 3 wt % and at most 8 wt %.

$SiO_2$ is not an essential component. However, by incorporating it, it is possible to suppress crystallization of the low melting glass and to increase the fluidity. However, if its content exceeds 1 wt %, the softening point tends to be too high. When it is required to carry out hermetic sealing at a low temperature, it is preferred not to incorporate it. $CeO_2$ is also not an essential component. However, it is capable of suppressing precipitation of $Bi_2O_3$ in the glass composition in the form of metallic bismuth in the molten glass and suppressing a decrease of the electrical insulation property of the hermetic sealing composition. However, if the content exceeds 10 wt %, the softening point tends to be too high, whereby hermetic sealing may not be carried out at a temperature of from 400° to 550° C. The content is preferably at least 0.01 wt % and at most 5 wt %.

Further, CaO, SrO and BaO may be incorporated within a range not to substantially increase the thermal expansion coefficient of the hermetic sealing composition. Furthermore, $In_2O_3$, $TiO_2$, $SnO_2$ and $ZrO_2$ may be incorporated within a range not to substantially increase the softening point, and $Li_2O$, $Na_2O$, $K_2O$, Cl and F may be incorporated within a range not to adversely affect the properties of CRT, PDP or VFD. If incorporated, such components should preferably be at most 10 wt %, particularly preferably at most 5 wt. %, in their total amount. CuO may deteriorate a phosphor in an electronic application. In such a case, it is advisable not to incorporate CuO.

The glass transition temperature of the glass obtained is preferably within a range of from 280° to 360° C. to obtain a proper hermetic sealing temperature. Especially for a hermetic sealing composition to be used in the field where a low hermetic sealing temperature is required, such as CRT, the glass transition temperature is preferably from 280° to 350° C., more preferably from 280° to 340° C.

In the present invention, the low expansion ceramic filler is a ceramic filler having a thermal expansion coefficient of at most $70 \times 10^{-7}/°C$. within a range of from room temperature to 300° C. Such a low expansion ceramic filler is preferably at least one member selected from the group consisting of zircon, cordierite, aluminum titanate, alumina, mullite, silica, β-eucryptite, β-spodumene and β-quartz solid solution. Particularly preferred are cordierite and zircon, since they are excellent in the sealing strength.

In the present invention, the content of the low melting glass powder is within a range of from 60 to 99 wt %, based on the total amount of the low melting glass powder and the low expansion ceramic filler powder, and the content of the low expansion ceramic filler powder is within a range of from 1 to 40 wt %, based on the total amount of the low melting glass powder and the low expansion ceramic filler.

If the low melting glass powder exceeds 99 wt %, the amount of the low expansion ceramic filler powder tends to be so small that the thermal expansion coefficient after firing of the hermetic sealing composition, tends to be too large, whereby the thermal expansion coefficient tends to mismatch with the glass to be sealed, and cracking is likely to result. If its content is less than 60 wt %, the glass content tends to be small, whereby the fluidity tends to be poor, and air tightness of the sealed portion tends to be impaired.

The average thermal expansion coefficient after firing of the hermetic sealing composition thus obtained, is preferably from $65 \times 10^{-7}$ to $100 \times 10^{-7}/°C$. within a range of from room temperature to 250° C. If the average thermal expansion coefficient departs from this range, matching of the thermal expansion coefficient with the glass to be sealed, tends to be difficult.

When the hermetic sealing composition of the present invention is used for hermetically sealing a panel and a funnel of CRT, it is preferred that the composition consists essentially of from 70 to 99 wt % of the bismuth type low melting glass powder and from 1 to 30 wt % of the low expansion ceramic filler powder, and the composition has an average thermal expansion coefficient after firing of from $80 \times 10^{-7}$ to $100 \times 10^{-7}/°C$. within a range of from room temperature to 300° C.

Such a hermetic sealing composition is capable of hermetically sealing a panel and a funnel of CRT by maintaining it at a temperature of from 400° to 550° C. for from 5 minutes to 1 hour, and it is free from flowing, bubbling or deterioration of the mechanical strength, by heating during evacuation at a temperature of from 300° to 380° C. after hermetic sealing.

In the case where the hermetic sealing composition of the present invention is used for hermetically sealing a panel and a funnel of CRT, if the content of the low melting glass powder exceeds 99 wt %, the amount of the low expansion ceramic filler powder tends to be small, whereby the thermal expansion coefficient tends to be too large and mismatches with the panel and the funnel, whereby breakage is likely to result. If the content is less than 70 wt %, the glass content tends to be small, whereby the fluidity tends to be poor, and no adequate vacuum for CRT tends to be obtained.

Further, if the average thermal expansion coefficient of the hermetic sealing composition after firing is outside the range of from $80 \times 10^{-7}$ to $100 \times 10^{-7}/°C$. within a range of from room temperature to 300° C., a tensile stress will be exerted to the panel glass or the funnel glass after hermetic sealing or to the sealed portion, whereby the strength of the bulb against pressure tends to be low.

In a case where the hermetic sealing composition of the present invention is used for sealing PDP or VFD, it is preferred that the composition consists essentially of from 60 to 98 wt % of the bismuth type low melting glass powder and from 2 to 40 wt % of the low expansion ceramic filler powder, and the composition has an average thermal expansion coefficient after firing of from $65 \times 10^{-7}$ to $90 \times 10^{-7}$° C. within a range of from room temperature to 250° C.

Such a hermetic sealing composition is capable of hermetically sealing PDP or VFD by maintaining it at a temperature of from 400° to 500° C. for from 5 minutes to 1 hour, and it is free from flowing, bubbling or deterioration of the mechanical strength by heating at a temperature of from 280° to 380° C. during evacuation after the sealing.

In the case where the hermetic sealing composition of the present invention is used for sealing PDP or VFD, if the content of the low melting glass powder exceeds 98 wt %, the amount of the low expansion ceramic filler powder tends to be small, whereby the thermal expansion coefficient after firing tends to be too large and tends to mismatch with the substrate glass, a tensile stress tends to remain at the seal frit portion after hermetic sealing, and thus such a portion is likely to break. If the content is less than 60 wt %, the glass content tends to be small, whereby it tends to be difficult to attain air tightness of the sealed portion adequate for PDP or VFD.

Further, if the average thermal expansion coefficient of the hermetic sealing composition after firing is outside the range of from $65 \times 10^{-7}$ to $90 \times 10^{-7}/°C$. within a range of from room temperature to 250° C., a tensile stress will be exerted to the substrate glass or to the sealed portion after hermetic sealing, and an strength against pressure tends to be low.

To this composition, a coloring agent such as a pigment may be incorporated for coloring.

Now, the present invention will be described in further detail with reference to Examples. However, it should be understood that the present invention is by no means restricted to such specific Examples.

EXAMPLES 1 TO 20

Starting materials were prepared and mixed to have a glass composition (unit: wt %) as identified in Table 1 or 2, and they were melted and vitrified at a temperature of from 1000° to 1400° C. to obtain glass. This glass was pulverized in a ball mill to obtain a low melting glass powder.

Such a low melting glass powder and a low expansion ceramic filler powder were mixed in the weight ratio as identified in the column for "sealing composition" in Table 1 or 2 to obtain a hermetic sealing composition.

Examples 1 to 17 represent the present invention, and Examples 18 to 20 represent Comparative Examples. Further, Examples 1 to 3 and 18 represent compositions prepared for application to CRT, Examples 4 to 16 and 19 represent compositions prepared for application to PDP, and Examples 17 and 20 represent compositions prepared for application to VFD.

With respect to each hermetic sealing composition, the flow button diameter, the bonding residual strain and the thermal expansion coefficient were measured, and the results are shown in Table 1 or 2. The respective measuring methods are as follows.

Flow Button Diameter

The flow button diameter represents the fluidity of the composition at the time of hermetic sealing. A sample powder of the hermetic sealing composition (8.0 g for CRT, and 4.5 g for PDP or VFD) was press-formed into a cylindrical shape having a diameter of 12.7 mm and then maintained at the firing temperature as identified in Table 1 or 2 for 30 minutes, whereby the diameter (unit: mm) of the fluidized hermetic sealing composition was taken as the flow button diameter. This flow button diameter is desired to be at least 26.5 mm for CRT and at least 20 mm for PDP or VFD.

Bonding Residual Strain

The hermetic sealing composition and a vehicle (a solution having 1.2% of nitrocellulose dissolved in isoamyl acetate) were mixed in a weight ratio of 9.0:1.0 to obtain a paste. This paste was coated on a funnel glass specimen for CRT, or on a substrate glass specimen for PDP or VFD, and fired under the same condition as in the case for the flow button diameter. Then, the residual strain (unit: nm/cm) formed between the glass specimen and the hermetic sealing composition after firing, was measured by means of a polarimeter. Symbol "+" shows that the hermetic sealing composition after firing has a compressive strain, and symbol "−" shows that the hermetic sealing composition after firing has a tensile strain. This residual strain is desired to be within a range of from −100 to +500 nm/cm.

Thermal Expansion Coefficient

The hermetic sealing composition was fired under the same condition as for the flow button diameter, and then polished to a predetermined size, and the elongation was measured by a thermal expansion measuring apparatus under a condition of a temperature raising rate of 10° C./min, whereupon the average thermal expansion coefficient (unit: ×10$^{-7}$/°C.) was calculated within a range of from room temperature to 300° C. (for application to CRT) or from room temperature to 250° C. (for application to PDP or VFD).

Further, the strength was measured with respect to CRT, PDP or VFD prepared by hermetical sealing by means of such a hermetic sealing composition.

With respect to CRT, the hermetic sealing composition was placed between a funnel and a panel of 25 inch size and maintained at a temperature of from 400° to 500° C. for 30 minutes to hermetically seal the funnel and the panel to obtain a bulb.

With respect to PDP, the hermetic sealing composition was preliminarily placed at the end portion of the substrates for PDP and maintained for hermetic sealing at a temperature of from 400° to 500° C. for 30 minutes to obtain a panel.

With respect to VFD, a grid was interposed between the end portions of glass substrates having an electrode, etc. formed thereon, and maintained at a temperature of from 400° to 500° C. for 30 minutes to hermetically seal the glass substrates to each other to form a panel.

With respect to such a bulb or panel, the strength against hydraulic pressure was measured, and the results are shown in Table 1 or 2. The method for measuring the strength against hydraulic pressure was as follows.

Strength Against Hydraulic Pressure

A pressure difference between the inside and outside of the bulb or panel was exerted by water, whereby the pressure difference at breakage was measured (unit: kg/cm$^2$, an average value of five samples). To ensure the strength as a bulb or panel, this strength is usually desired to be at least 3 kg/cm$^2$.

Further, the glass transition temperature of the glass used for each hermetic sealing composition is shown in Table 1 or 2. The glass transition temperature was measured by DTA at a temperature raising rate of 10° C./min.

From Tables 1 and 2, it is apparent that the hermetic sealing compositions of the present invention have practically adequate properties. Further in Examples 18 to 20, the flow button diameter is small, and the strength against hydraulic pressure is low.

TABLE 1

|  |  | 1 | 2 | 3 | 4 | 5 |
|---|---|---|---|---|---|---|
| Application |  | CRT | | | PDP | |
| Glass composition (wt %) | $Bi_2O_3$ | 92 | 89 | 91 | 86 | 85.7 |
|  | MgO | 2 | — | 1 | 5 | — |
|  | ZnO | — | 4 | 3 | 1 | 9 |
|  | $B_2O_3$ | 5 | 4 | 4 | 7 | 5 |
|  | $SiO_2$ | — | 1 | — | — | — |
|  | $CeO_2$ | 1 | 2 | 1 | 1 | 0.3 |
|  | $In_2O_3$ | — | — | — | — | — |
|  | $SnO_2$ | — | — | — | — | — |
|  | $TiO_2$ | — | — | — | — | — |
|  | $ZrO_2$ | — | — | — | — | — |
| Sealing composition (wt %) | | | | | | |
| Glass |  | 85 | 83 | 80 | 76 | 75 |
| Filler | Zircon | — | — | 16 | — | 25 |
|  | Cordierite | 15 | — | — | 21 | — |
|  | Alumina | — | — | 1 | — | — |
|  | Mullite | — | — | — | — | — |
|  | Aluminum titanate | — | 12 | — | — | — |
|  | Silica | — | — | — | 3 | — |
|  | β-Eucryptite | — | 3 | 3 | — | — |
|  | β-Spodumene | — | 1 | — | — | — |
|  | β-Quartz solid solution | — | 1 | — | — | — |
| Firing Temperature (°C.) | | 440 | 460 | 450 | 480 | 500 |
| Flow button diameter (mm) | | 26.7 | 27.4 | 26.8 | 20.8 | 21.5 |
| Bonding residual strain (nm/cm) | | +60 | +25 | +40 | +100 | +35 |
| Thermal expansion coefficient (× 10$^{-7}$/°C.) | | 88 | 94 | 91 | 73 | 79 |
| Strength against hydraulic pressure (kg/cm$^2$) | | 4.2 | 3.8 | 4.0 | 4.2 | 3.8 |
| Glass transition temperature (°C.) | | 315 | 320 | 310 | 330 | 336 |

TABLE 1-continued

|  |  | 6 | 7 | 8 | 9 | 10 |
|---|---|---|---|---|---|---|
| Application |  | PDP | | | | |
| Glass composition (wt %) | $Bi_2O_3$ | 83 | 79.8 | 85 | 88 | 83 |
|  | MgO | — | — | — | — | — |
|  | ZnO | 11 | 13.9 | 10 | 5.7 | 9.7 |
|  | $B_2O_3$ | 5.6 | 5.9 | 4.7 | 6 | 7 |
|  | $SiO_2$ | — | — | — | — | — |
|  | $CeO_2$ | 0.4 | 0.4 | 0.3 | 0.3 | 0.3 |
|  | $In_2O_3$ | — | — | — | — | — |
|  | $SnO_2$ | — | — | — | — | — |
|  | $TiO_2$ | — | — | — | — | — |
|  | $ZrO_2$ | — | — | — | — | — |
| Sealing composition (wt %) | | | | | | |
| Glass | | 72 | 80 | 73 | 80 | 78 |
| Filler | Zircon | 20 | 10 | 27 | 10 | 10 |
|  | Cordierite | 8 | 5 | — | 5 | 5 |
|  | Alumina | — | — | — | — | — |
|  | Mullite | — | — | — | 3 | 4 |
|  | Aluminum titanate | — | — | — | — | — |
|  | Silica | — | 5 | — | 2 | 3 |
|  | β-Eucryptite | — | — | — | — | — |
|  | β-Spodumene | — | — | — | — | — |
|  | β-Quartz solid solution | — | — | — | — | — |
| Firing Temperature (°C.) | | 500 | 500 | 500 | 500 | 510 |
| Flow button diameter (mm) | | 21.6 | 20.1 | 22.5 | 20.5 | 20.2 |
| Bonding residual strain (nm/cm) | | +90 | +120 | +85 | +35 | +90 |
| Thermal expansion coefficient ($\times 10^{-7}$/°C.) | | 75 | 70 | 75 | 78 | 75 |
| Strength against hydraulic pressure (kg/cm²) | | 3.8 | 3.9 | 3.8 | 3.6 | 3.8 |
| Glass transition temperature (°C.) | | 346 | 350 | 339 | 325 | 346 |

TABLE 2

|  |  | 11 | 12 | 13 | 14 | 15 |
|---|---|---|---|---|---|---|
| Application |  | PDP | | | | |
| Glass composition (wt %) | $Bi_2O_3$ | 80 | 78 | 83.5 | 84.4 | 85 |
|  | MgO | — | — | — | — | — |
|  | ZnO | 12 | 14 | 8.7 | 8.9 | 8.9 |
|  | $B_2O_3$ | 7.6 | 7.6 | 5 | 5 | 5 |
|  | $SiO_2$ | — | — | — | — | — |
|  | $CeO_2$ | 0.4 | 0.4 | 0.3 | 0.3 | 0.3 |
|  | $In_2O_3$ | — | — | 2.5 | — | — |
|  | $SnO_2$ | — | — | — | 1.4 | — |
|  | $TiO_2$ | — | — | — | — | 0.8 |
|  | $ZrO_2$ | — | — | — | — | — |
| Sealing composition (wt %) | | | | | | |
| Glass | | 73 | 75 | 72 | 73 | 72 |
| Filler | Zircon | — | 15 | 20 | 25 | 23 |
|  | Cordierite | 17 | 5 | 8 | 2 | 5 |
|  | Alumina | — | — | — | — | — |
|  | Mullite | 5 | — | — | — | — |
|  | Aluminum titanate | — | — | — | — | — |
|  | Silica | 5 | 5 | — | — | — |
|  | β-Eucryptite | — | — | — | — | — |
|  | β-Spodumene | — | — | — | — | — |
|  | β-Quartz solid solution | — | — | — | — | — |
| Firing Temperature (°C.) | | 500 | 500 | 500 | 500 | 500 |
| Flow button diameter (mm) | | 21.0 | 20.5 | 22.0 | 22.5 | 22.1 |
| Bonding residual strain (nm/cm) | | +110 | +130 | +105 | +70 | +65 |
| Thermal expansion coefficient ($\times 10^{-7}$/°C.) | | 73 | 70 | 72 | 75 | 75 |
| Strength against hydraulic pressure (kg/cm²) | | 4.0 | 4.2 | 4.0 | 3.7 | 3.7 |
| Glass transition temperature (°C.) | | 354 | 358 | 348 | 343 | 342 |

TABLE 2-continued

|  |  | 16 | 17 | 18 | 19 | 20 |
|---|---|---|---|---|---|---|
| Application |  | PDP | VFD | CRT | PDP | VFD |
| Glass composition (wt %) | $Bi_2O_3$ | 82 | 79 | 97 | 75 | 79 |
|  | MgO | — | 1 | — | 23 | 1 |
|  | ZnO | 11 | 12 | 1 | — | 12 |
|  | $B_2O_3$ | 5.5 | 7 | 2 | 2 | 7 |
|  | $SiO_2$ | — | — | — | — | — |
|  | $CeO_2$ | 0.3 | 1 | — | — | 1 |
|  | $In_2O_3$ | — | — | — | — | — |
|  | $SnO_2$ | — | — | — | — | — |
|  | $TiO_2$ | — | — | — | — | — |
|  | $ZrO_2$ | 1.2 | — | — | — | — |
| Sealing composition (wt %) | | | | | | |
| Glass | | 74 | 74 | 80 | 75 | 54 |
| Filler | Zircon | 26 | — | 15 | 10 | — |
|  | Cordierite | — | 26 | — | — | — |
|  | Alumina | — | — | 5 | — | — |
|  | Mullite | — | — | — | — | — |
|  | Aluminum titanate | — | — | — | — | — |
|  | Silica | — | — | — | — | — |
|  | β-Eucryptite | — | — | — | 15 | — |
|  | β-Spodumene | — | — | — | — | 46 |
|  | β-Quartz solid solution | — | — | — | — | — |
| Firing Temperature (°C.) | | 500 | 490 | 440 | 460 | 450 |
| Flow button diameter (mm) | | 22.2 | 20.6 | 20.8 | 15.3 | 14.7 |
| Bonding residual strain (nm/cm) | | +60 | +80 | -10 | -5 | +250 |
| Thermal expansion coefficient ($\times 10^{-7}$/°C.) | | 74 | 74 | 98 | 86 | 68 |
| Strength against hydraulic pressure (kg/cm²) | | 3.9 | 3.9 | 1.2 | 1.0 | 1.5 |
| Glass transition temperature (°C.) | | 358 | 355 | 295 | 320 | 355 |

According to the present invention, it is possible to obtain a hermetic sealing composition which contains no lead and which is suitable for hermetically sealing e.g. CRT, PDP of VFD. CRT, PDP and VFD sealed by means of the hermetic sealing composition of the present invention are excellent particularly in the strength against hydraulic pressure.

What is claimed is:

1. A hermetic sealing composition consisting essentially of from 60 to 99 wt % of a bismuth type low melting glass powder and from 1 to 40 wt % of a low expansion ceramic filler powder, wherein the low melting glass has a composition consisting essentially of:

| $Bi_2O_3$ | 77 to 95 wt %, |
|---|---|
| MgO + ZnO | 1 to 20 wt %, |
| $B_2O_3$ | 2 to 10 wt %, |
| $SiO_2$ | 0 to 1 wt % and |
| $CeO_2$ | 0 to 10 wt %. |

2. The hermetic sealing composition according to claim 1, wherein the low expansion ceramic filler is at least one member selected from the group consisting of zircon, cordierite, aluminum titanate, alumina, mullite, silica, β-eucryptite, β-spodumene and β-quartz solid solution.

3. The hermetic sealing composition according to claim 1, which has an average thermal expansion coefficient after firing of from $65 \times 10^{-7}$ to $100 \times 10^{-7}$/°C. within a range of from room temperature to 250° C.

4. The hermetic sealing composition according to claim 1, which consists essentially of from 70 to 99 wt. % of the bismuth type low melting glass powder and from 1 to 30 wt % of the low expansion ceramic filler powder, which has an average thermal expansion coefficient after firing of from $80 \times 10^{-7}$ to $100 \times 10^{-7}$/°C. within a range of from room temperature to 300° C., and which is used for hermetically sealing a panel and a funnel of a cathode ray tube.

5. The hermetic sealing composition according to claim 1, which consists essentially of from 60 to 98 wt % of the bismuth type low melting glass powder and from 2 to 40 wt % of the low expansion ceramic filler, which has an average thermal expansion coefficient after firing of from $65\times10^{-7}$ to $90\times10^{-7}/°C$. within a range of from room temperature to 250° C., and which is used for hermetically sealing a plasma display or a fluorescent character display tube.

6. The hermetic sealing composition according to claim 1, wherein the low melting glass has a composition consisting essentially of:

| | |
|---|---|
| $Bi_2O_3$ | 77 to 95%, |
| $MgO + ZnO$ | 1 to 20%, |
| $ZnO + Bi_2O_3$ | 85 to 98%, |
| $B_2O_3$ | 2 to 10%, |
| $SiO_2$ | 0 to 1% and |
| $CeO_2$ | 0 to 10%. |

\* \* \* \* \*